United States Patent
Wexler et al.

(10) Patent No.: US 10,577,547 B2
(45) Date of Patent: Mar. 3, 2020

(54) PROCESS FOR PRODUCING FUELS FROM A BLENDED BIORENEWABLE FEED

(71) Applicant: UOP LLC, Des Plaines, IL (US)

(72) Inventors: James T. Wexler, East Lansing, MI (US); Richard K. Hoehn, Mount Prospect, IL (US); Joe Quock, St. Charles, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/907,060

(22) Filed: Feb. 27, 2018

(65) Prior Publication Data
US 2019/0264114 A1    Aug. 29, 2019

(51) Int. Cl.
*C10G 65/00* (2006.01)
*C10G 65/06* (2006.01)

(52) U.S. Cl.
CPC ....... *C10G 65/06* (2013.01); *C10G 2300/202* (2013.01); *C10G 2400/04* (2013.01)

(58) Field of Classification Search
CPC ...... C10G 2300/1011; C10G 2300/202; C10G 3/42; C10G 3/50; C10G 57/00; C10G 7/00; C07C 4/06; C07C 1/20; C07C 5/13; C07C 1/22; C07C 2/06; C07C 2/58; C07C 5/05; C07C 5/09; C07C 5/2506; C07C 7/005; C07C 7/163
See application file for complete search history.

(56) References Cited

U.S. PATENT DOCUMENTS

| | | |
|---|---|---|
| 4,310,440 A | 1/1982 | Wilson et al. |
| 4,440,871 A | 4/1984 | Lok et al. |
| 4,758,419 A | 7/1988 | Lok et al. |
| 4,793,984 A | 12/1988 | Lok et al. |
| 4,795,623 A | 1/1989 | Evans |
| 4,924,027 A | 5/1990 | Kulprathipanja et al. |
| 4,943,424 A | 7/1990 | Miller |
| 5,082,956 A | 1/1992 | Monnier et al. |
| 5,087,347 A | 2/1992 | Miller |
| 5,158,665 A | 10/1992 | Miller |
| 5,208,005 A | 5/1993 | Miller |
| 5,246,566 A | 9/1993 | Miller |
| 5,444,032 A | 8/1995 | Perego et al. |
| 5,510,306 A | 4/1996 | Murray |
| 5,608,968 A | 3/1997 | Maus et al. |
| 5,716,897 A | 2/1998 | Galperin et al. |
| 5,741,759 A | 4/1998 | Gee et al. |
| 5,851,949 A | 12/1998 | Galperin et al. |
| 5,908,134 A | 6/1999 | Hale et al. |
| 5,981,419 A | 11/1999 | Carati et al. |
| 8,318,996 B2 | 11/2012 | Murty et al. |
| 8,541,636 B2 | 9/2013 | Vergel |
| 8,551,327 B2 | 10/2013 | Lewis et al. |
| 8,623,102 B2 | 1/2014 | Quignard et al. |
| 8,686,204 B2 | 4/2014 | Bozzano et al. |
| 8,822,744 B2 | 9/2014 | Mizan et al. |
| 9,062,258 B2 | 6/2015 | Mayeur et al. |
| 9,109,168 B2 | 8/2015 | Dupassieux et al. |
| 9,416,321 B2 | 8/2016 | Eizenga et al. |
| 9,481,836 B2 | 11/2016 | Yao et al. |
| 9,523,050 B2 | 12/2016 | Pandranki et al. |
| 9,663,720 B2 | 5/2017 | Nousiainen et al. |
| 9,822,314 B2 | 11/2017 | Ray |
| 2010/0270207 A1 | 10/2010 | Gomes et al. |
| 2011/0099891 A1 | 5/2011 | Kaul et al. |
| 2016/0289568 A1 | 10/2016 | Dutta et al. |
| 2017/0029347 A1 | 2/2017 | Ellig et al. |
| 2018/0216010 A1* | 8/2018 | Hong ........................ C10G 3/50 |

OTHER PUBLICATIONS

Calemma, Hydroisomerization and hydrocracking of long chain n-alkanes on Pt/amorphous SiO2—Al2O3 catalyst, Applied Catalysis A: General 190 (2000) 207-218.

Miller, New Molecular Sieve Process for Lube Dewaxing by Wax Isomerization, 2 Microporous Materials 439-449 (1994).

* cited by examiner

*Primary Examiner* — Sharon Pregler
(74) *Attorney, Agent, or Firm* — Paschall & Associates, LLC; James C. Paschall

(57) ABSTRACT

The invention provides processes for the production of hydrocarbons from a biorenewable feedstock blended with a mineral feedstock comprises hydrotreating to remove heteroatoms and saturate olefins. The carbon monoxide is not fed to the downstream hydroisomerization reactor but supplanted with a hydrogen gas with a low concentration of carbon monoxide so as not to poison the hydroisomerization catalyst to improve the cold flow properties for a diesel fuel.

18 Claims, 1 Drawing Sheet

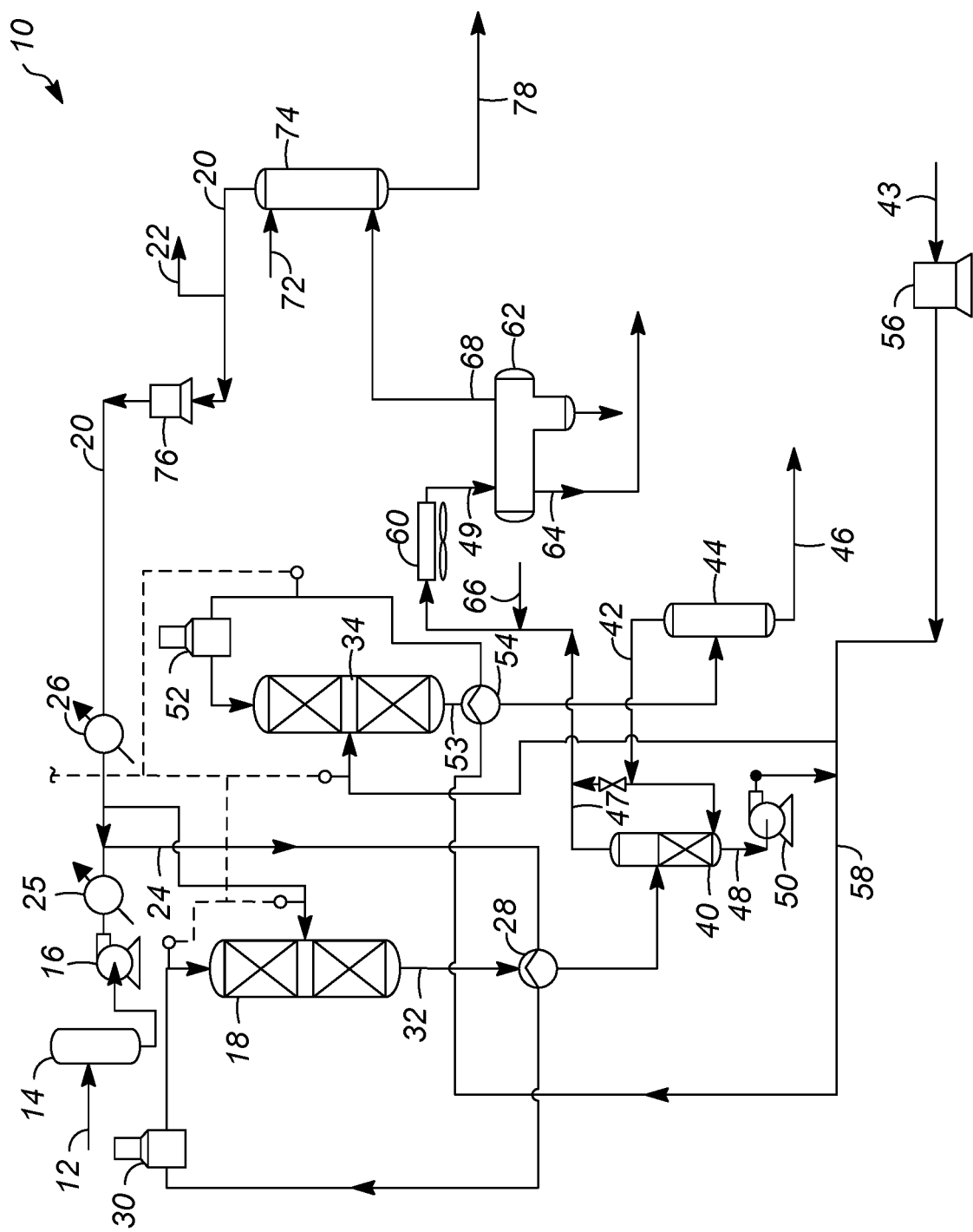

PROCESS FOR PRODUCING FUELS FROM A BLENDED BIORENEWABLE FEED

FIELD

The field is producing hydrocarbons useful as diesel boiling range fuel or aviation range fuel components from renewable feedstocks such as triglycerides and free fatty acids found in materials such as plant and animal fats and oils blended with mineral feedstock.

BACKGROUND

As the demand for fuel increases worldwide, there is increasing interest in producing fuels and blending components from sources other than crude oil. Often referred to as a renewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process wherein hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating followed by hydroisomerization to improve cold flow properties of product diesel. Hydroisomerization or dewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Diesel fuel streams must meet cold flow property specifications particularly for winter fuel use. One cold flow property is "pour point" which is the temperature at which a hydrocarbon stream becomes semi-solid and loses its flow characteristics. A high pour point is generally associated with a higher normal paraffin content or a normal paraffin content comprising higher carbon number. Another cold flow property is "cloud point" which is the temperature below which wax in the hydrocarbon stream begins to form a cloudy appearance. The "cold filter plugging point" of diesel fuel is the temperature at which the presence of solidified waxes clogs fuel filters and injectors in engines. The wax also can accumulate on cold surfaces such as on a pipeline or heat exchanger tube and form an emulsion with water.

If co-processing bio-renewable feedstock in a distillate hydrotreating unit along with mineral feedstock, there is a challenge of meeting the cold flow property requirements of the finished product diesel because the diesel range product converted from bio-renewable feedstock consists largely of normal paraffins. The addition of a bed of hydrodewaxing or hydroisomerization catalyst in the hydrotreating reactor may not be effective to produce biorenewable diesel with adequate cold flow property requirements.

The hydrogenation of biorenewable feedstock results in $CO_2$ and CO in the hydrotreated effluent. Carbon dioxide may be removed in an amine recycle gas scrubber. However, carbon monoxide concentration can only be reduced by purging a portion of the recycle gas. Since carbon monoxide inhibits the activity of hydrodewaxing or hydroisomerization catalyst, it may not be possible to place hydrodewaxing or hydroisomerization catalyst in the hydrotreating reactor, and it may not be possible to use hydrotreating recycle gas from the amine recycle gas scrubber as recycle gas for a separate hydrodewaxing or hydroisomerization reactor.

It would be desirable to provide a process and apparatus for the production of distillate hydrocarbons from a renewable feedstock that can meet cold flow property requirements applicable to diesel.

SUMMARY OF THE INVENTION

A process and apparatus for producing a transportation fuel from a renewable feedstock comprises hydrotreating a renewable feed stream comprising a blend of biorenewable and mineral feedstock in the presence of a hydrotreating hydrogen stream and a hydrotreating catalyst to provide a hydrotreated stream, separating the hydrotreated stream to provide a hydrotreated vapor stream and a hydrotreated liquid stream, and hydroisomerizing the hydrotreated liquid stream over a hydroisomerization catalyst in the presence of a hydroisomerization hydrogen stream comprising less than 200 vppm carbon monoxide to provide a hydroisomerized stream. In an aspect, a hydroisomerization separator may be in downstream communication with the hydroisomerization reactor and a hydrotreating separator in downstream communication with a hydrotreating reactor may be in downstream communication with the hydroisomerization separator.

DETAILED DESCRIPTION OF THE DRAWING

The FIGURE shows a process flow diagram of one or more processes and apparatuses described herein.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam.

Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D-7169, ASTM D-86 or TBP, as the case may be.

As used herein, the term "end point" (EP) means the temperature at which the sample has all boiled off using ASTM D-7169, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.).

As used herein, the term "diesel cut point" is between about 343° C. (650° F.) and about 399° C. (750° F.) using the TBP distillation method.

As used herein, the term "diesel boiling range" means hydrocarbons boiling in the range of between about 132° C. (270° F.) and the diesel cut point using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

The term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

DETAILED DESCRIPTION

We have discovered a process and apparatus that enables renewable feedstock blended with mineral feedstock to be processed into diesel that meets cold flow property specifications. Hydrotreated renewable feedstock contains substantial quantities of carbon monoxide that can deactivate hydroisomerization catalyst. Hence, the gases are separated from the hydrotreated feed stream and replaced with clean make up gas that comprises less than 200 vppm carbon monoxide before it is hydroisomerized to meet cold flow property requirements.

As shown in the FIGURE, in accordance with an exemplary embodiment, a process 10 for processing a blend of biorenewable feedstock and mineral feedstock. Referring to the FIGURE, feed line 12 transports a feed stream of fresh biorenewable and mineral feedstock into a feed surge drum 14. The blended feed stream may comprise about 3 to about 40 wt % biorenewable feedstock, preferably about 5 to about 30 wt % biorenewable feedstock and the balance being a mineral feedstock. A mineral feedstock is a conventional feed derived from crude oil that is extracted from the ground. A hydrocarbons stream derived from crude oil boiling in the diesel boiling range hydrocarbon is a suitable mineral feed stock. The mineral feedstock may comprise 0.2 to 3 wt % sulfur and 10 to 800 wppm nitrogen.

A variety of different biorenewable feedstocks may be suitable for the process 10. The term "biorenewable feedstock" is meant to include feedstocks other than those obtained from crude oil. The biorenewable feedstock may include any of those feedstocks which comprise at least one of glycerides and free fatty acids (FFA). Most of triglycerides will be triglycerides, but monoglycerides and diglycerides may be present and processed as well. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of renewable feedstocks include non-edible vegetable oils from the group comprising *Jatropha curcas* (Ratanjot, Wild Castor, Jangli Erandi), *Madhuca*

*indica* (Mohuwa), *Pongamia pinnata* (Karanji, Honge), *Calophyllum inophyllum, Moringa oleifera* and *Azadirachta indica* (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

The feed stream in feed line 12 flows from the feed surge drum 14 via a charge pump 16 and mixes with a purified recycle gas comprising a hydrotreating hydrogen stream in a hydrotreating hydrogen line 20 which may be heated in a recycle gas exchanger 26. The fresh feed stream 12 may be heated in a feed exchanger 25 before mixing with the hydrotreating hydrogen stream. The combined feed stream in a combined feed line 24 is heated in a combined feed exchanger 28 and flows to a hydrotreating heater 30 where additional heat is provided before entering a hydrotreating reactor 18.

In the hydrotreating reactor 18, the combined feed 24 is contacted with a hydrotreating catalyst at hydrotreating conditions to saturate the olefinic or unsaturated portions of the n-paraffinic chains in the biorenewable feedstock. The hydrotreating catalyst also catalyzes hydrodeoxygenation including decarboxylation to remove oxygenate functional groups from the biorenewable feedstock which are converted to water. The hydrotreating catalyst also catalyzes desulfurization of organic sulfur in the mineral feedstock and denitrogenation or organic nitrogen in the both the mineral and biorenewable feedstock. Essentially, the hydrotreating reaction removes heteroatoms from the hydrocarbons and saturates olefins in the feed stream.

The hydrotreating catalyst may be provided in one, two or more beds and employ interbed hydrogen quench from the hydrotreating hydrogen stream from the hydrotreating hydrogen line 20.

The hydrotreating catalyst may comprise nickel, nickel/molybdenum, or cobalt/molybdenum dispersed on a high surface area support. Other catalysts include one or more noble metals dispersed on a high surface area support. Non-limiting examples of noble metals include platinum and/or palladium dispersed on an alumina support such as gamma-alumina. Generally, hydrotreating conditions include a temperature of about 40 to about 700° C. and a pressure of about 700 kPa (100 psig) to about 21 MPa (3000 psig).

A hydrotreated stream is produced in a hydrotreated effluent line 32 from the hydrotreating reactor 18 comprising a liquid portion and a gaseous portion. The liquid portion comprises a hydrocarbon fraction which has a substantial n-paraffin concentration due to the biorenewable feedstock. Oxygenate concentration in the hydrocarbon fraction is essentially nil, whereas the olefin concentration is substantially reduced relative to the feed stream. The organic sulfur concentration in the hydrocarbon fraction is no more than 500 wppm and the organic nitrogen concentration in the hydrocarbon fraction is less than 10 wppm. Although this hydrocarbon fraction is useful as a diesel fuel, because it comprises a substantial concentration of n-paraffins from the biorenewable feedstock, it will have poor cold flow properties. The hydrotreated stream can be contacted with an isomerization catalyst under isomerization conditions to at least partially isomerize the n-paraffins to isoparaffins, as hereinafter described in a separate isomerization reactor 34.

The hydrotreated stream in the hydrotreated effluent line 32 flows to the combined feed exchanger 28 to provide heat to the hydrotreating feed as previously described to cool the hydrotreated stream in the hydrotreated effluent line 32.

Before isomerization, the hydrotreated stream in the hydrotreated effluent line 32 enters a downstream hydrotreating separator 40. The hydrotreating separator 40 may be an enhanced hot separator (EHS) 40 which is a high pressure stripping column. In the EHS, the liquid phase flows down through the column where it is partially stripped of hydrogen, carbon dioxide, carbon monoxide, water vapor, propane, hydrogen sulfide, and phosphine, which are potential isomerization catalyst poisons, by stripping gas in a stripping gas line 42. The stripping gas may comprise makeup hydrogen gas which has passed through the isomerization reactor 34 and an isomerization separator 44 as hereinafter described.

The stripping gas in the stripping gas line 42 enters the enhanced hot separator 40 below the inlet for the hydrotreated effluent in the hydrotreated effluent line 32. The EHS may include internals such as trays or packing to facilitate stripping of the liquid phase. The stripped gases and stripping gas exit in a vapor hydrotreated stream in a hydrotreated overhead line 47 extending from a top of the hydrotreating separator 40 and mix with wash water injection stream from a water line 66 and flow to a product condenser 60 upstream of a cold separator 62. The vapor hydrotreated stream is condensed and cooled in the product condenser 60. The cooled vapor hydrotreated stream in a cooled hydrotreated overhead line 49 enters the cold separator 62. In the cold separator 62, a liquid water phase is separated in a boot from a cold liquid product in a cold bottoms line 64, which comprises a diesel fuel. The cold bottoms line 64 extends from a bottom of the cold separator 62. The cold liquid product in the cold bottoms line 64 is withdrawn from the cold separator 62 and sent to a fractionation column perhaps after further removal of volatiles in a cold flash drum and/or a stripping column (not shown). The water withdrawn from the boot may be sent to a sour water stripper (not shown).

A hydrotreated liquid stream which may have been stripped collects in the bottom of the hydrotreating separator 40 and flows in a hydrotreated bottoms line 48 to the suction side of a bottoms pump 50. The hydrotreated liquid stream comprises predominantly diesel range material, with a paraffinic concentration due to the biorenewable feedstock.

While a desired product, such as a transportation fuel, may be provided in the hydrotreated bottoms line 48 because the hot liquid stream comprises a higher concentration of normal paraffins, it will have poor cold flow properties. Accordingly, to improve the cold flow properties, the hydrotreated liquid stream is contacted with a hydroisomerization catalyst in a hydroisomerization reactor 34 under hydroisomerization conditions to hydroisomerize the normal paraffins to branched paraffins.

It is desired that the hydrotreated liquid stream be hydroisomerized over hydroisomerization catalyst in the presence of a hydroisomerization hydrogen stream that comprises no more than 200 vppm carbon monoxide to provide a hydroisomerized stream. Carbon monoxide is a poison for hydroisomerization catalyst which will deactivate the hydroisomerization catalyst, so carbon monoxide concentration must be kept low. Preferably, the concentration of carbon monoxide in the hydroisomerization hydrogen stream is no more than 50 vppm carbon monoxide. The hydrotreating hydrogen stream has a lower hydrogen purity than the hydroisomerization hydrogen stream. In an aspect, the hydroisomerization hydrogen stream solely comprises make up hydrogen.

Makeup hydrogen gas in make-up line 43 is compressed in a makeup gas compressor 56 and mixed with the hydrotreated liquid stream from the hydrotreated bottoms line 48 from the pump 50 to provide a hydroisomerization feed stream in a hydroisomerization feed line 58. Solely make-up hydrogen may be used as the hydroisomerization hydrogen stream. The combined hydroisomerization feed stream in a combined feed line 58 is heated in an isomerization combined feed exchanger 54 and flows to a hydroisomerization heater 52 where additional heat is provided before entering a hydroisomerization reactor 34. The hydrotreated liquid stream in the presence of a hydroisomerization hydrogen stream comprises no more than 200 wppm carbon monoxide.

The hydroisomerization, including hydrodewaxing, of the normal hydrocarbons can be accomplished over one or more beds of hydroisomerization catalyst, and the hydroisomerization may be operated in a co-current mode of operation. Fixed bed, trickle bed down flow or fixed bed liquid filled up-flow modes are both suitable. Make-up hydrogen from the make-up line 43 may be provided for interbed quench to the hydroisomerization reactor 34.

Suitable hydroisomerization catalysts may comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal, Me, is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

Hydroisomerization conditions generally include a temperature of about 150° C. to about 450° C. and a pressure of about 1724 kPa (absolute) (250 psia) to about 13.8 MPa (absolute) (2000 psia). In another embodiment, the hydroisomerization conditions include a temperature of about 300° C. to about 360° C. and a pressure of about 3102 kPa (absolute) (450 psia) to about 6895 kPa (absolute) (1000 psia).

A hydroisomerized stream in a hydroisomerized effluent line 53 from the isomerization reactor 34 is a branched-paraffin-rich stream. By the term "rich" it is meant that the effluent stream has a greater concentration of branched paraffins than the stream entering the isomerization reactor 34, and preferably comprises greater than 50 mass-% branched paraffins of the total paraffin content. It is envisioned that the hydroisomerized effluent may contain 70, 80, or 90 mass-% branched paraffins of the total paraffin content. Only minimal branching is required, enough to improve the cold-flow properties of the hydrotreated hot liquid stream to meet specifications. Hydroisomerization conditions are selected to avoid undesirable cracking, so the predominant product in the hydroisomerized stream in the hydroisomerized effluent line 53 is a mono-branched paraffin.

The hydroisomerized stream in the hydroisomerized effluent line 53 from the isomerization reactor 34 flows to an isomerization combined feed exchanger 54 before entering the hydroisomerization separator 44 for separation into a liquid hydroisomerized stream and vapor hydroisomerized stream. The vapor hydroisomerized stream in a hydroisomerized overhead line 42 extending from an overhead of hydroisomerization separator 44 flows to the hydrotreating separator 40 and may serve as the stripping gas in the EHS. A portion of the vapor hydroisomerized stream may bypass the hydrotreating separator 40 and enter the hydrotreated overhead line 47 through a control valve.

The liquid hydroisomerized stream in a hydroisomerization bottoms line 46 extending from a bottom of the hydroisomerization separator 44 comprising a diesel fuel may be sent directly to a fractionation column for producing co-products without condensing and cooling of the diesel fuel. The diesel fuel from the hydroisomerization separator 44 may be further separated in a flash drum and/or stripped and transported to a fractionation column (not shown).

In the hydrotreating separator 40, vaporous components in the vapor hydroisomerization stream in the hydroisomerized overhead line 42 will separate and ascend with the hydrotreated vapor stream in the hydrotreating overhead line 47, be cooled and separated in the cold separator 62. In an aspect, the vapor hydroisomerization stream strips vaporous components from liquid components from the hydrotreated stream in the hydrotreated effluent line 32. As previously mentioned, the cold liquid stream in the cold bottoms line 64 can be fractionated into hydrocarbon fuel products. The cold vapor stream in the cold overhead line 68 extending from an overhead of the cold separator 62 comprises hydrogen, carbon monoxide carbon dioxide, hydrogen sulfide and other gases. The cold vapor stream in the cold overhead line 68 is rich in hydrogen. Thus, hydrogen can be recovered from the cold vapor stream to provide a hydrogen recycle stream.

The cold vapor stream in the cold overhead line 68 may be passed through a trayed or packed recycle scrubbing column 74 where it is scrubbed by means of a scrubbing extraction liquid such as an aqueous solution fed by line 72 to remove acid gases including hydrogen sulfide and carbon dioxide by extracting them into the aqueous solution. Preferred extraction liquids include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide. The resultant "sweetened" cold vapor stream is taken out from an overhead outlet of the recycle scrubber column 74 in a recycle scrubber overhead line 20, and a rich amine is taken out from the bottoms at a bottom outlet of the recycle scrubber column in a recycle scrubber bottoms line 78. The spent scrubbing liquid from the bottoms may be regenerated and recycled back to the recycle scrubbing column 74 in the solvent line 72. The scrubbed hydrogen-rich stream emerges from the scrubber via the recycle scrubber overhead line 20 and may be compressed in a recycle compressor 76.

The scrubbed hydrogen-rich stream in the scrubber overhead line 20 comprises carbon monoxide that may poison hydroisomerization catalyst. Hence, it may only be recycled to the hydrotreating reactor 18 but not to the hydroisomerization reactor 34. Additionally, to keep the carbon monoxide concentration below harmful levels for the hydrotreating catalyst, a purge stream of the scrubbed hydrogen-rich stream in scrubber overhead line 20 is purged in purge line 22. The hydrogen stream to the hydroisomerization reactor 34 is operated as hydrogen once through to provide only hydrogen to the hydroisomerization reactor 34 that has no more than 200 vppm, preferably no more than 50 vppm carbon monoxide. The compressed hydrogen stream supplies hydrogen to the hydrotreating hydrogen stream in the hydrotreating hydrogen line 20. A portion of the compressed hydrogen stream in recycle hydrogen line 20 may be used as interbed quench in the hydrotreating reactor 18. The hydroisomerization reactor 34 is out of downstream communication with hydrotreating separator overhead line 47 and the hydroisomerization overhead line 47 that are in downstream communication with the scrubber overhead line 20.

The recycle scrubbing column 74 may be operated with a gas inlet temperature between about 38° C. (100° F.) and about 66° C. (150° F.) and an overhead pressure of about 3 MPa (gauge) (435 psig) to about 20 MPa (gauge) (2900 psig). Suitably, the recycle scrubbing column 74 may be operated at a temperature of about 40° C. (104° F.) to about 125° C. (257° F.) and a pressure of about 1200 to about 1600 kPa. The temperature of the hot vapor stream to the recycle scrubbing column 74 may be between about 20° C. (68° F.) and about 80° C. (176° F.) and the temperature of the scrubbing extraction liquid stream in the solvent line 64 may be between about 20° C. (68° F.) and about 70° C. (158° F.).

The cold liquid stream in cold bottoms line 64 and the liquid hydroisomerized stream in hydroisomerized bottoms line 46 comprise hydrocarbons useful as diesel boiling range fuel as well as other hydrocarbons such as propane, naphtha and aviation fuel. Accordingly, they may be separated further in the fractionation column into a light hydrocarbon stream, comprising for example $C_{3-}$ hydrocarbons, a naphtha stream, comprising $C_4$ to $C_9$ hydrocarbons, a kerosene stream comprising $C_9$ to $C_{16}$ hydrocarbons and a diesel boiling range fuel comprising $C_{10}$ to $C_{24}$ hydrocarbons.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for producing a transportation fuel from a renewable feedstock, the process comprising hydrotreating a feed stream comprising renewable feed stock and mineral feed stock in the presence of a hydrotreating hydrogen stream and a hydrotreating catalyst to desulfurize and deoxygenate the feed stream to provide a hydrotreated stream; separating the hydrotreated stream to provide a hydrotreated vapor stream and a hydrotreated liquid stream having less sulfur concentration and oxygen concentration than the feed stream, and hydroisomerizing the hydrotreated liquid stream over a hydroisomerization catalyst in the presence of a hydroisomerization hydrogen stream comprising less than 200 vppm carbon monoxide to provide a hydroisomerized stream. An embodiment of the invention is one, any or all of prior embodiments in this paragraph up through the first embodiment in this paragraph wherein the hydrotreating hydrogen stream has a lower hydrogen purity than the hydroisomerization hydrogen stream. An embodiment of the invention is one, any or all of prior embodiments in this paragraph up through the first embodiment in this paragraph further comprising stripping the hydrotreated stream with a stripping gas to separate the hydrotreated stream to provide a hydrotreated vapor stream and a hydrotreated liquid stream. An embodiment of the invention is one, any or all of prior embodiments in this paragraph up through the first embodiment in this paragraph further comprising separating the hydroisomerized stream to provide a vapor hydroisomerized stream and a liquid hydroisomerized stream. An embodiment of the invention is one, any or all of prior embodiments in this paragraph up through the first embodiment in this paragraph further comprising stripping the hydrotreated stream with a stripping gas comprising the vapor hydroisomerized stream to separate the hydrotreated stream to provide a hydrotreated vapor stream and a hydrotreated liquid stream. An embodiment of the invention is one, any or all of prior embodiments in this paragraph up through the first embodiment in this paragraph further comprising bypassing a portion of the vapor hydroisomerized stream around the stripping step. An embodiment of the invention is one, any or all of prior embodiments in this paragraph up through the first embodiment in this paragraph further comprising separating the hydrotreated vapor stream and/or the vapor hydroisomerized stream to provide a hydrogen recycle stream and a cold liquid stream. An embodiment of the invention is one, any or all of prior embodiments in this paragraph up through the first embodiment in this paragraph further comprising scrubbing the hydrogen recycle stream to remove acid gases. An embodiment of the invention is one, any or all of prior embodiments in this paragraph up through the first embodiment in this paragraph further comprising purging a portion of the scrubbed hydrogen recycle stream. An embodiment of the invention is one, any or all of prior embodiments in this paragraph up through the first embodiment in this paragraph further comprising recycling the scrubbed hydrogen recycle stream to the hydrotreating step. An embodiment of the invention is one, any or all of prior embodiments in this paragraph up through the first embodiment in this paragraph further comprising at least one of sensing at least one parameter of the process and generating a signal or data from the sensing; generating and transmitting the signal or data. An embodiment of the invention is one, any or all of prior embodiments in this paragraph up through the first embodiment in this paragraph wherein the hydrotreated liquid stream in the presence of a hydroisomerization hydrogen stream comprise no more than 200 wppm carbon monoxide. An embodiment of the invention is one, any or all of prior embodiments in this paragraph up through the first embodiment in this paragraph wherein the hydroisomerization hydrogen stream solely comprises make up hydrogen.

A second embodiment of the invention is a process for producing a transportation fuel from a renewable feedstock, the process comprising hydrotreating a feed stream comprising about 3 to about 40 wt % renewable feedstock and mineral feedstock in the presence of a hydrotreating hydrogen stream and a hydrotreating catalyst to provide a hydrotreated stream; separating the hydrotreated stream to provide a hydrotreated vapor stream and a hydrotreated liquid stream having less sulfur concentration and oxygen concentration than the feed stream, and hydroisomerizing the hydrotreated liquid stream over a hydroisomerization catalyst in the presence of a hydroisomerization hydrogen stream; stripping the hydrotreated stream with a stripping gas to separate the hydrotreated stream to provide a hydrotreated vapor stream and a hydrotreated liquid stream. An embodiment of the invention is one, any or all of prior embodiments in this paragraph up through the second embodiment in this paragraph further comprising separating the hydroisomerized stream to provide a vapor hydroisomerized stream and a liquid hydroisomerized stream; stripping the hydrotreated stream with a stripping gas comprising the vapor hydroisomerized stream to separate the hydrotreated stream to provide a hydrotreated vapor stream and a hydrotreated liquid stream.

A third embodiment of the invention is a process for producing a transportation fuel from a renewable feedstock, the process comprising hydrotreating a feed stream comprising renewable feed stock and mineral feed stock in the presence of a hydrotreating hydrogen stream and a hydrotreating catalyst to desulfurize and deoxygenate the feed stream to provide a hydrotreated stream; separating the hydrotreated stream to provide a hydrotreated vapor stream and a hydrotreated liquid stream having less sulfur concentration and oxygen concentration than the feed stream, and hydroisomerizing the hydrotreated liquid stream over a hydroisomerization catalyst in the presence of a hydroisomerization hydrogen stream comprising less than 200 vppm carbon monoxide to provide a hydroisomerized stream. An embodiment of the invention is one, any or all of prior embodiments in this paragraph up through the third embodiment in this paragraph further comprising about 3 to about 40 wt % renewable feedstock in the feed stream. An embodiment of the invention is one, any or all of prior embodiments in this paragraph up through the third embodiment in this paragraph wherein the hydrotreated liquid stream in the presence of a hydroisomerization hydrogen stream comprise no more than 200 wppm carbon monoxide. An embodiment of the invention is one, any or all of prior embodiments in this paragraph up through the third embodiment in this paragraph wherein the hydroisomerization hydrogen stream solely comprises make up hydrogen.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A process for producing a transportation fuel from a renewable feedstock, the process comprising:
    hydrotreating a feed stream comprising renewable feed stock and mineral feed stock in the presence of a hydrotreating hydrogen stream and a hydrotreating catalyst to desulfurize and deoxygenate said feed stream to provide a hydrotreated stream;
    separating the hydrotreated stream to provide a hydrotreated vapor stream and a hydrotreated liquid stream having less sulfur concentration and oxygen concentration than the feed stream; and hydroisomerizing the hydrotreated liquid stream over a hydroisomerization catalyst in the presence of a hydroisomerization hydrogen stream comprising less than 200 vppm carbon monoxide to provide a hydroisomerized stream.

2. The process of claim 1 wherein the hydrotreating hydrogen stream has a lower hydrogen purity than the hydroisomerization hydrogen stream.

3. The process of claim 1 further comprising stripping the hydrotreated stream with a stripping gas to separate the hydrotreated stream to provide a hydrotreated vapor stream and a hydrotreated liquid stream.

4. The process of claim 1 further comprising separating the hydroisomerized stream to provide a vapor hydroisomerized stream and a liquid hydroisomerized stream.

5. The process of claim 4 further comprising stripping the hydrotreated stream with a stripping gas comprising the vapor hydroisomerized stream to separate the hydrotreated stream to provide a hydrotreated vapor stream and a hydrotreated liquid stream.

6. The process of claim 5 further comprising bypassing a portion of the vapor hydroisomerized stream around the stripping step.

7. The process of claim 4 further comprising separating the hydrotreated vapor stream and/or the vapor hydroisomerized stream to provide a hydrogen recycle stream and a cold liquid stream.

8. The process of claim 7 further comprising scrubbing the hydrogen recycle stream to remove acid gases.

9. The process of claim 8 further comprising purging a portion of the scrubbed hydrogen recycle stream.

10. The process of claim 9 further comprising recycling said scrubbed hydrogen recycle stream to the hydrotreating step.

11. The process of claim 1 further comprising at least one of:
sensing at least one parameter of the process and generating a signal or data from the sensing;
generating and transmitting said signal or data.

12. The process of claim 1 wherein the hydrotreated liquid stream in the presence of a hydroisomerization hydrogen stream comprise no more than 200 wppm carbon monoxide.

13. The process of claim 1 wherein said hydroisomerization hydrogen stream solely comprises make up hydrogen.

14. A process for producing a transportation fuel from a renewable feedstock, the process comprising:
hydrotreating a feed stream comprising about 3 to about 40 wt % renewable feedstock and mineral feedstock in the presence of a hydrotreating hydrogen stream and a hydrotreating catalyst to provide a hydrotreated stream;
separating the hydrotreated stream to provide a hydrotreated vapor stream and a hydrotreated liquid stream having less sulfur concentration and oxygen concentration than said feed stream;
hydroisomerizing the hydrotreated liquid stream over a hydroisomerization catalyst in the presence of a hydroisomerization hydrogen stream, wherein the hydroisomerization hydrogen stream comprises make up hydrogen; and
stripping the hydrotreated stream with a stripping gas to separate the hydrotreated stream to provide a hydrotreated vapor stream and a hydrotreated liquid stream.

15. The process of claim 14 further comprising:
separating the hydroisomerized stream to provide a vapor hydroisomerized stream and a liquid hydroisomerized stream; and
stripping the hydrotreated stream with a stripping gas comprising the vapor hydroisomerized stream to separate the hydrotreated stream to provide a hydrotreated vapor stream and a hydrotreated liquid stream.

16. A process for producing a transportation fuel from a renewable feedstock, the process comprising:
hydrotreating a feed stream comprising renewable feed stock and mineral feed stock in the presence of a hydrotreating hydrogen stream and a hydrotreating catalyst to desulfurize and deoxygenate said feed stream to provide a hydrotreated stream;
separating the hydrotreated stream to provide a hydrotreated vapor stream and a hydrotreated liquid stream having less sulfur concentration and oxygen concentration than said feed stream; and
hydroisomerizing the hydrotreated liquid stream over a hydroisomerization catalyst in the presence of a hydroisomerization hydrogen stream comprising less than 200 vppm carbon monoxide to provide a hydroisomerized stream, wherein the hydroisomerization hydrogen stream comprises make up hydrogen.

17. The process of claim 16 further comprising about 3 to about 40 wt % renewable feedstock in the feed stream.

18. The process of claim 16 wherein the hydrotreated liquid stream in the presence of a hydroisomerization hydrogen stream comprise no more than 200 wppm carbon monoxide.

* * * * *